(12) United States Patent
Appel et al.

(10) Patent No.: US 9,073,160 B2
(45) Date of Patent: Jul. 7, 2015

(54) SUCTION DEVICE AND CONTROL METHOD

(71) Applicant: Hilti Aktiengesellschaft, Schaan (LI)

(72) Inventors: Hans Appel, Munich (DE); Egon Koenigbauer, Eichenau (DE)

(73) Assignee: Hilti Aktiengesellschaft, Schaan (LI)

( * ) Notice: Subject to any disclaimer, the term of this patent is extended or adjusted under 35 U.S.C. 154(b) by 154 days.

(21) Appl. No.: 13/687,993

(22) Filed: Nov. 28, 2012

(65) Prior Publication Data

US 2013/0136549 A1 May 30, 2013

(30) Foreign Application Priority Data

Nov. 29, 2011 (DE) .......................... 10 2011 087 361

(51) Int. Cl.
| | |
|---|---|
| H02K 9/06 | (2006.01) |
| B23Q 11/12 | (2006.01) |
| B23Q 11/00 | (2006.01) |
| B23Q 17/00 | (2006.01) |
| B25D 11/12 | (2006.01) |
| G01D 3/10 | (2006.01) |
| G01D 5/14 | (2006.01) |

(52) U.S. Cl.
CPC ........... *B23Q 11/0046* (2013.01); *Y10T 408/44* (2015.01); *B23Q 17/00* (2013.01); *G01D 3/10* (2013.01); *G01D 5/145* (2013.01); *B25D 11/125* (2013.01); *B25D 2250/221* (2013.01)

(58) Field of Classification Search
CPC .................................................. B23Q 11/0046
USPC .......... 318/4, 5, 39, 51, 53, 62, 445, 450, 452, 318/453, 471–473, 484, 490, 647; 388/937
See application file for complete search history.

(56) References Cited

U.S. PATENT DOCUMENTS

| | | | |
|---|---|---|---|
| RE21,180 E | * | 8/1939 | Myers |
| 6,455,186 B1 | * | 9/2002 | Moores et al. .................. 429/71 |
| 2009/0145621 A1 | * | 6/2009 | Lau et al. ...................... 173/217 |

FOREIGN PATENT DOCUMENTS

| | | |
|---|---|---|
| DE | 10 2006 031 507 A1 | 1/2008 |
| EP | 1 281 486 A1 | 2/2003 |
| EP | 2 366 490 A1 | 9/2011 |
| EP | 2 366 491 A1 | 9/2011 |
| WO | WO 2008/003544 A1 | 1/2008 |
| WO | WO 2011/114818 A1 | 9/2011 |

OTHER PUBLICATIONS

European Search Report, dated Mar. 1, 2013, 8 pages.
German Search Report, dated May 10, 2012, 4 pages.

* cited by examiner

*Primary Examiner* — Bentsu Ro
(74) *Attorney, Agent, or Firm* — Crowell & Moring LLP

(57) ABSTRACT

A suction device with a hand-held power drill is disclosed. The suction device has a housing and a locking mechanism for fastening the housing to a housing of the hand-held power drill. The suction device furthermore has a fan motor and a controller for the fan motor. The controller contains a sensor for detecting the operating state of an electric motor of the hand-held power tool. The controller is configured to activate the fan motor when the electric motor is in a rotating state of operation.

5 Claims, 8 Drawing Sheets

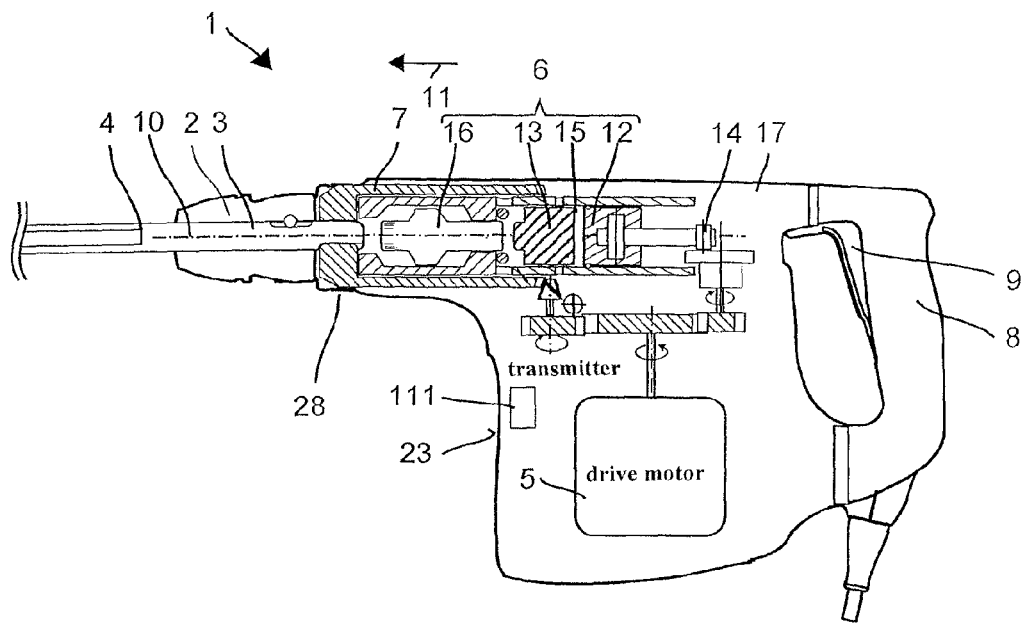
Fig. 2
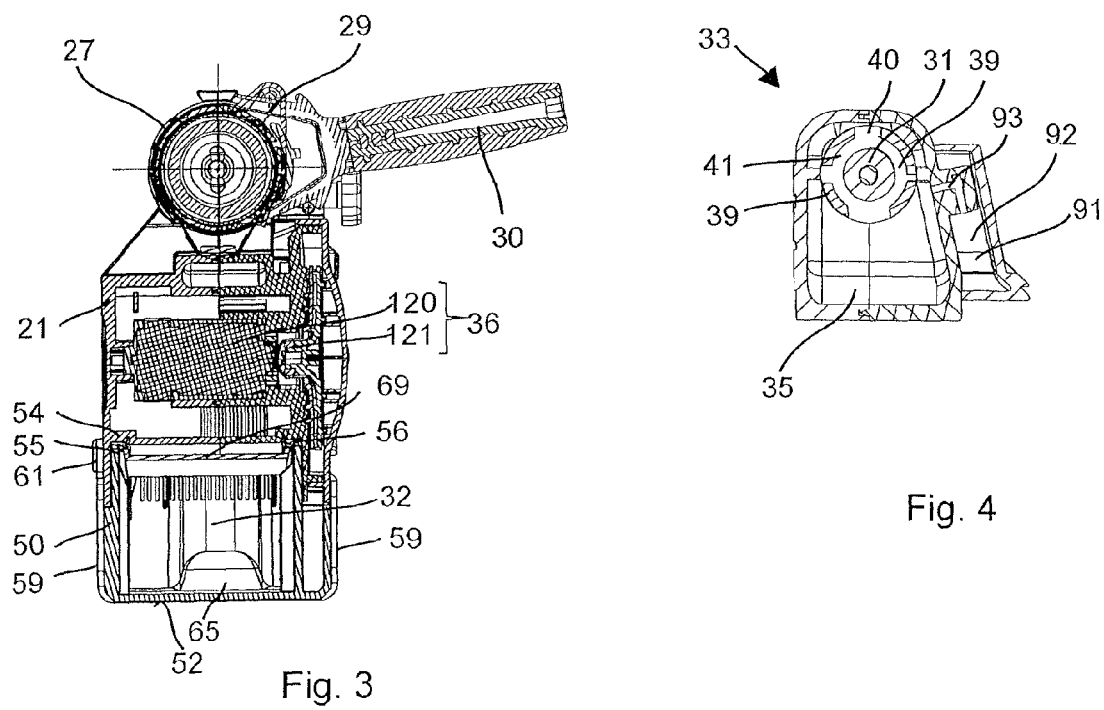
Fig. 3
Fig. 4

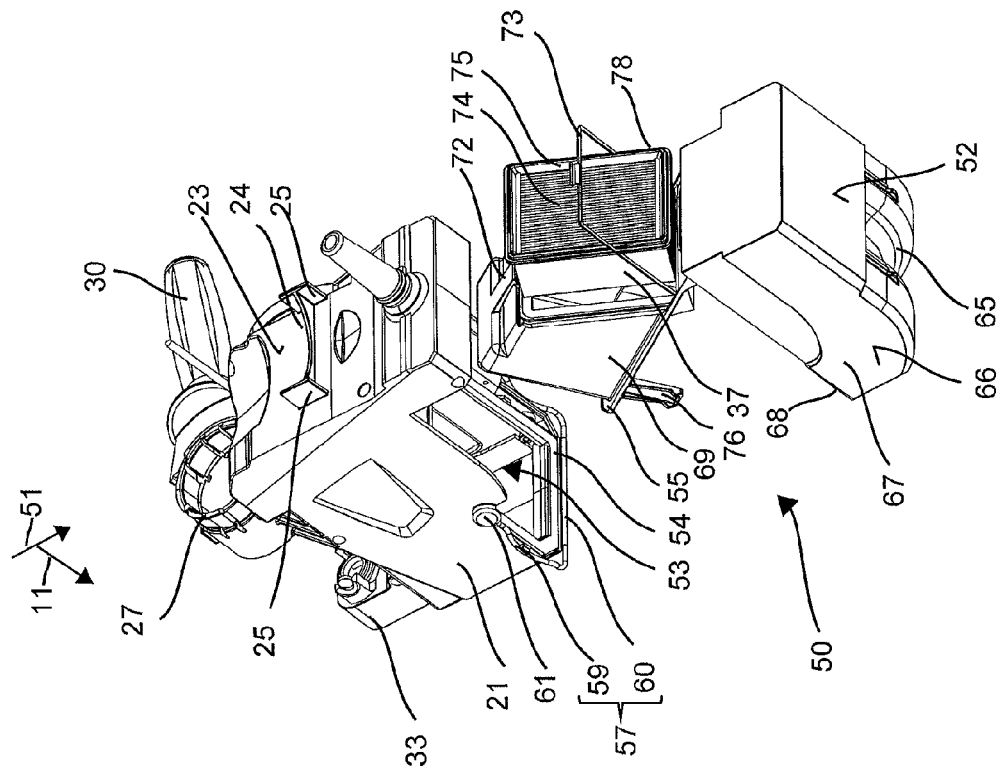
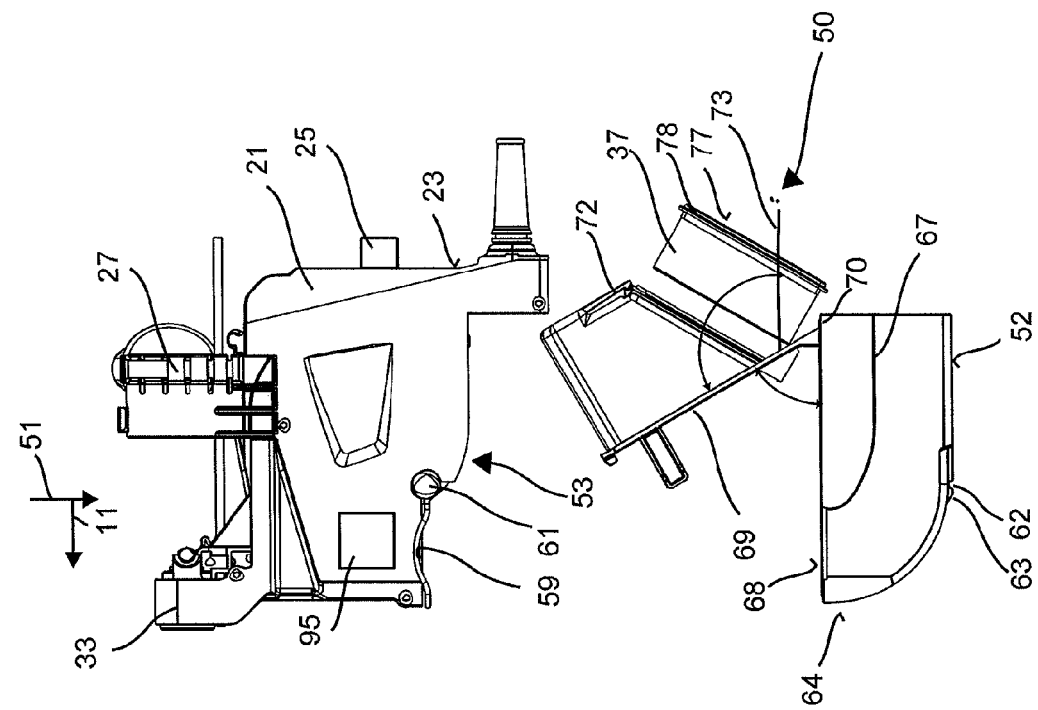

SUCTION DEVICE AND CONTROL METHOD

This application claims the priority of German Patent Document No. DE 10 2011 087 361.9, filed Nov. 29, 2011, the disclosure of which is expressly incorporated by reference herein.

BACKGROUND AND SUMMARY OF THE INVENTION

The present invention relates to a suction device for a hand-held power drill, especially for a hand-held power tool using a drilling bit, and to a control method for this purpose.

The amount of drilling dust obtained varies depending on the area of application. A suction device is frequently not required. A modular suction device is therefore desired, which a user can attach and release once again from a hand-held power tool with a few manipulations and without any tool. Adaptations of the hand-held power tool for a joint use with the suction device should be kept to a minimum.

An inventive suction device for a hand-held power drill in accordance with the present invention has a housing and a locking device for fastening the housing to a housing of a hand-held power drill. A user can attach and remove the suction device without tools. The suction device furthermore has a fan motor and a controller for the fan motor. The controller contains a sensor for detecting the operating state of an electric motor of the hand-held power tool. The controller is set up to activate the fan motor when the electric motor is in a rotating state of operation. The hand-held power tool does not contain any additional circuits or arrangements, which ensure that the suction device is switched on. Likewise, a switch element, which has to be activated by the user, is not required at the suction device.

One embodiment provides that the sensor detects a magnetic field generated by the electric motor and activates the control mechanism of the fan motor when the strength of the magnetic field exceeds a threshold value. The magnetic field proves to be a robust feature, which is not distorted by interfering signals even under the rough operating conditions of drilling, especially those encountered when a hand-held power drill is used with a drill bit. The sensor is able to detect a static magnetic field generated by the electric motor. The sensor is able to detect an alternating magnetic field produced by the electric motor and to supply the signal of the sensor to a high pass filter. The latter proves to be independent of the electric motor used in the hand-held power tool.

A switch may be disposed between the power supply of the suction device and the control system. The sensor contains a transducer coil, which is coupled with a switch in such a manner, that a current, induced in the transducer coil by the electric motor, switches the switch. This is of advantage especially when the suction device is supplied by a battery package. A loss of power due to a control system actively checking the sensor is avoided.

In accordance with one embodiment, the control system contains a timer, by means of which the switching off of the fan motor is delayed when the operating state of the electric motor is changed to a stationary state. The fan motor is switched on preferably immediately when there is a change to the rotating state of operation.

A control method for a suction device, which is designed for a hand-held power drill, employs the following steps in an embodiment: the operating state of an electric motor of the hand-held power tool is determined by a sensor in the suction device. A fan motor of the suction device is activated when the sensor detects a change in the operating state of the electric motor to a rotating operating state. The fan motor of the suction device is deactivated when the sensor detects a change in the operating state of the electric motor to a stationary operating state. The fan motor is activated preferably without delay after the change into the rotating state of operation; the deactivation of the fan motor, on the other hand, may be delayed when the operating state is changed to a stationary one.

The following description explains the invention by means of embodiments, given by way of example, and by means of Figures.

BRIEF DESCRIPTION OF THE DRAWINGS

FIG. 2 shows a diagrammatic construction of a hammer drill;

FIG. 3 shows a section through the suction device in the plane of FIG. 1;

FIG. 4 shows a section through the suction device in the plane IV-IV of FIG. 1;

FIGS. 5 and 6 show a suction device, which has been removed and opened;

DETAILED DESCRIPTION OF THE DRAWINGS

Elements, which are identical or have the same function, are indicated by the same reference numbers in the Figures, unless indicated otherwise.

Figure 1:
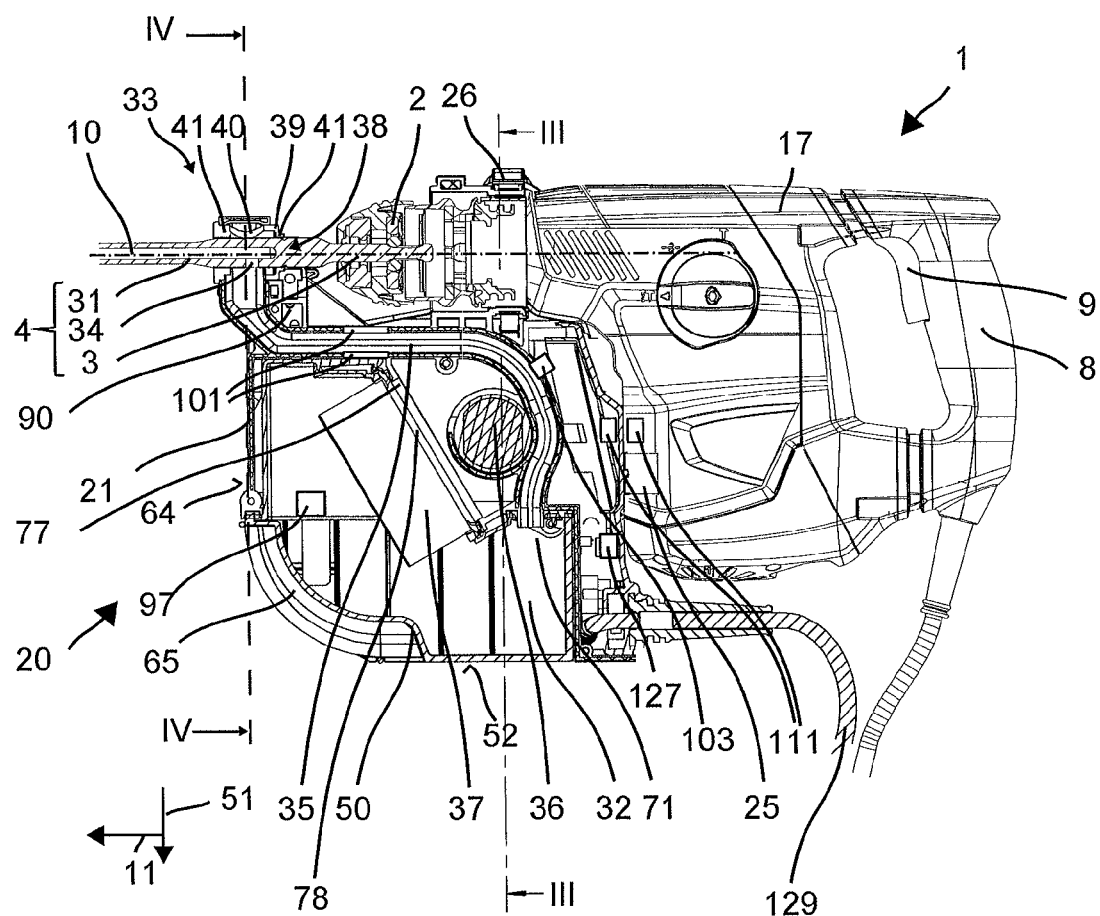
FIG. 1 shows a hammer drill and a suction device.

FIG. 1 shows a hand-held power drill 1 with a removable suction device 20 for the suction drill 4 attached.

FIG. 2 shows the details of a hammer drill 1 as an example of a hand-held power drill. The hammer drill 1 has a tool holder 2, in which the inserting end 3 of a drill, such as a chiseling suction drill 4, can be inserted. A rotating drive motor 5, preferably an electric motor, which drives a hammer mechanism 6 and a driveshaft 7, forms the primary driving mechanism of the hammer drill 1. A user can guide the hammer drill 1 by a handle 8 and start up the hammer drill 1 by a system switch 9. When in operation, the hammer drill 1 rotates the suction drill 4 continuously about a working axis 10 and, at the same time, beats the suction drill 4 in the beating direction 11 along the working axis 10 into a substrate.

The hammer mechanism 6 is, for example, a pneumatic hammer mechanism 6. An exciter 12 and a beater 13 are guided movably in the hammer mechanism 6 along the working axis 10. The exciter 12 is coupled over an eccentric 14 or a wobble finger to the drive motor 5 and forced to carry out a periodic, linear movement. An air spring, formed by a pneumatic chamber 15 between the exciter 12 and the beater 13, couples the movement of the beater 13 to the movement of the exciter 12. The beater 13 can beat directly on the rear end of the suction drill 4 or indirectly, over an essentially stationary intermediate beater 16, to transfer a portion of its impetus to the suction drill 4. The hammer mechanism 6 and, preferably, the other components of the driving mechanism are disposed within the machine housing 17.

FIG. 1 shows the suction device 20 placed against and locked to the hammer drill 1, FIG. 3 shows a section in the plane III-III and FIG. 4 shows a section in the plane IV-IV. FIGS. 5 and 6 show a suction device 20, which has been removed from the hammer drill 1 and opened to empty out the drilling dust.

The suction device 20 has its own housing 21, which is separate from the machine housing 17 of the hammer drill 1. The suction device 20 rests preferably with a rear side of its housing 21 pointing counter to the beating direction 11, at a front side 23 of the hammer drill 1. The contact between the suction device 20 and the hammer drill 1 is formed, for example, by a concave membrane 24 at the rear. Two flanks 25 of the membrane 24 wrap around the side surfaces of the hammer drill 1. Preferably, the membrane 24 may be molded positively to the front side 23 of the hammer drill 1.

A locking system 26 enables a user to fasten the suction device 20 detachably to, or remove it from, the hammer drill 1. The locking system 26 comprises, for example, a ring 27, which can envelop a neck 28 of the hammer drill 1. The ring 27 may contain its own clamping mechanism in the form of springs, screw-type clamping units, etc. In the case of the embodiment shown by way of example, the ring 27 is slotted repeatedly. A tightening strip 29 of a side handle 30 may embrace and compress the ring 27 and, in this way, clamp the ring to the neck 28. The locking mechanism 26 may, for example, also contain pins and/or loops at the rear, which engage counter pieces of the hammer drill 1 of the appropriately complementary construction.

The suction device 20 aspirates the drilling dust from the hollow shaft 31 of the suction drill 4 into a collection container 32 of the suction device 20. A suction connection piece 33 forms a ring around a suction opening 34 of the suction drill 4. An air duct 35 in the housing 21 leads from the suction connection piece 33 to the collection container 32. In the direction of flow, a blower 36 is disposed behind the collection container 32. An air filter 37 between the blower 36 and the collection container 32 ensures that the dust particles are deposited in the collection container 32.

Preferably, the suction connection piece 33 is adapted to the structure of the suction drill 4. The positioning is accomplished by attaching the suction device 20 to the hammer drill 1. Along the working axis 10, the suction connection piece 33 has a fixed position in relation to the tool holder 2. In particular, the position of the suction connection piece 33 is not changed while the hole is being drilled. A passage opening 38, coaxial with the working axis 10, is lined, for example, with a cylindrical sleeve 39. The suction connection piece 33 is hollow on the inside and surrounds sleeve 39. In an axial, central region, the sleeve 39 has an internal diameter, which is larger than the diameter of the suction drill 4 at the suction opening 34. Axial end pieces 40 of the sleeve 39 have an internal diameter, which is less than that of the central region. The internal diameter thereof is designed for a clearance of about 1 mm to 2 mm with regard to the suction drill 4. The suction drill 4 is passed through the sleeve 39 without making contact. One or more radial openings 41 break through the sleeve 39. In its dimensions along the working axis 10, a length of the sleeve 39 is, for example, between 2 cm and 3 cm and somewhat larger than an axial movement freedom of the largest suction drill 4 in the tools seat 2.

The rigid air duct 35 is closed directly at the suction connection piece 33 and extends closed up to the collection container 32. The air duct 35, which preferably is closed over its whole length, is open only at the suction connection piece 33 and the collection container 32. The cross-section of the air duct 35 is preferably constant over the entire length.

The collection container 32 has a drawer 50, which can be pushed into and taken out of the housing 21. The drawer 50 can be pulled out in a removal direction 51. The removal direction 51 is, for example, downward, that is, in a radial direction away from the working axis 10. The drawer 50 is formed by an underside 52 of the housing 21. When removed, the drawer 50 opens up an opening 53 of the housing 21. The drawer 50 is constructed complementarily to the opening 53. The opening 53 is closed off airtight and dust-tight by the inserted drawer 50. A seal is produced, for instance, by a border 54 of the housing 21, which surrounds the opening 53 in a closed ring. The border 54 is, for example, in a plane perpendicular to the removal direction 51. The drawer 50 is provided with a border 55, which is constructed complementarily to the border 54. The border 55 of the drawer 50 rests against the border 54 of the housing 21, when the drawer 50 is inserted. The border 54 of the housing 21 or the border 55 of the drawer 50 is provided with a sealing ring 56 of an elastic material, such as rubber or foam.

A pivotable catch 57 is suspended at the housing 21. The catch 57 can be swiveled from an unlocked position in the swiveling direction into a locked position. The locked position is shown in FIG. 3 and the unlocked position in FIG. 5. The catch 57, given by way of example, has two lateral legs 59 and a bar 60, connecting the legs 59. The legs 59 are suspended at pivot bearings 61 at the housing 21. In the locked position, the bar 60 of the catch 57 takes hold of the underside 52 of the drawer 50 from behind. In the locked position, the legs 59 are aligned predominantly parallel to the removal direction 51. The dimensions of the legs 59 are such that, in the locked position, the bar 60 of the catch 57 presses the drawer 50 against the housing 21. The catch 57, given by way of example, is partly elastic and consists, for example, of steel. A curved, for example, arching course of the legs 59 enables the legs 59 to be stretched elastically when a counter force is applied. Accordingly, in the locked position, the catch 57 presses the drawer 50 counter to the removal direction 51 against the housing 21. The seal 56 is squeezed by the pre-stressing in the locked position. The seal 56 may be produced from an elastic material, such as rubber, which, alternatively or in addition to the elastic catch 57, produces pre-stressing in the locked position.

A latching 62 at the underside 52 holds the catch preferably in the locked position. At the underside 52 of the drawer 50, there is a local, triangular projection 63, over which the catch 57, especially the crossbar 60, is pushed during the locking process. By these means, the catch 57 is latched in the locked position.

The underside 52 of the drawer 50 has a groove 65, which extends to the front 64. The groove 65 extends preferably over the whole swiveling path of the catch 57, that is, from the latched position up to the unlatched position for removing the drawer 50. The user can take hold of the catch 57 in the groove 65 from behind in order to swivel it.

Instead of with two legs 59, the catch 57 may also be provided with only one leg and one hook, which take hold of the drawer 50 from below. An alternative configuration has laterally protruding studs at the side surfaces 66 of the drawer 50. The catches 57 take hold of these studs from behind.

In a different embodiment, the drawer 50 can be pulled out to one side, that is, tangentially to the working axis 10. The catch 57 is disposed so that it can be swiveled about the working axis 10 and, in the locked position, takes hold of the side of the drawer 50 from the rear.

The drawer 50 has a bowl 67, the upper side 68 of which is provided with a pivotable lid 69. The upper side 68 points counter to the removal direction 51. When the drawer 50 is inserted, the upper side 68 lies against the housing 21, as a result of which the lid 69 is kept closed. The pivotable lid 69 preferably covers more than half the upper side 68. The remaining part of the upper side 68 can be closed off by a rigid lid 70, which cannot be removed. The air filter 37 is disposed in the pivotable lid 69. An opening 71, through which the air duct 35 discharges into the drawer 50, is disposed in the immobile lid 70.

Preferably, the air filter 37 can be removed from the lid 69, so that, when dirty, it can be exchanged for a fresh air filter 37. The air filter 37 is inserted in a holder 72. A bracket 73, which can be locked and pivoted, clamps the air filter 37 into the holder 72. The holder 72 of the air filter 37 holds the air filter 37 at an angle of, preferably, between 30° and 60°, with respect to the removal direction 51. Preferably, the air filter 37 is a lamella filter, the folded lamellas 74 of which are clamped in a frame 75.

When the drawer 50 is inserted, the air filter 37 lies against an opening of the housing 21, the size of which is the same as the front surface 77 of the air filter 37. A sealing lip 78 around the front surface 77 seals off the air filter 37 with the housing 21, when the drawer 50 is inserted. Preferably, the sealing lip 78 is compressed by the locked catch 57. The drawer 50 is in contact with the housing 21 over two separate seals 56, 78. When projected onto a plane perpendicular to the removal direction 51, the sealing lip 78 lies within the sealing ring 56. Along an air flow through the drawer 50, the sealing ring 56 is disposed offset to the sealing lip 78. Both seals enclose the flow of air annularly.

The lid 69 contributes between 20% and 40% to the volume of the collection container 32. The lid 69 has, for example, a prismatic shape, which is open in the direction of the bowl 67. The lid 69 is arched away from the bowl 67, that is, opposite to the removal direction 51. When the drawer 50 is closed, a border-shaped edge 55 of the lid rests on the bowl 67. One or more locking tabs 76 at the lid 69 or the bowl 67 can hold this together.

Figure 7:
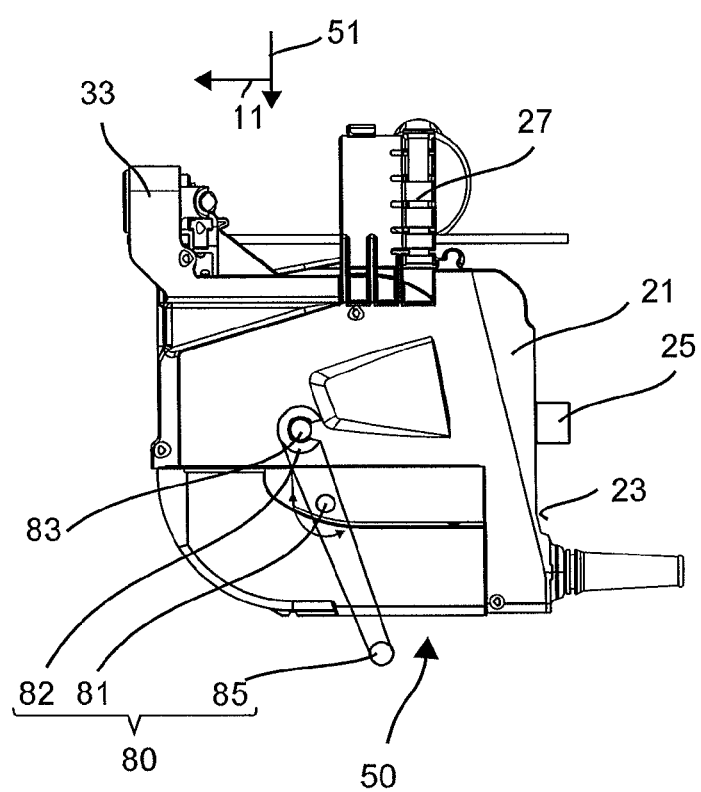
FIG. 7 shows an alternative locking of a drawer.
Figure 8:
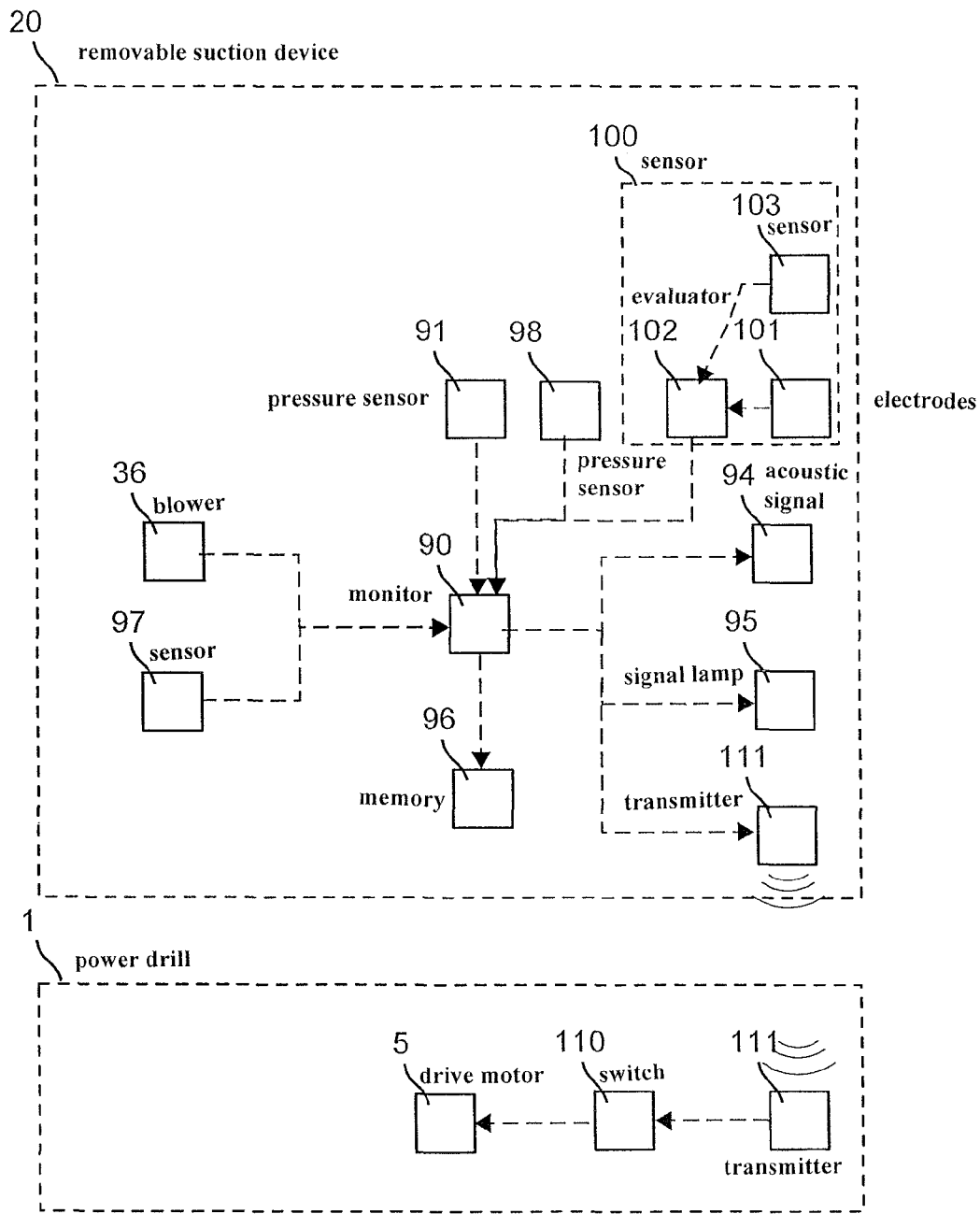
FIG. 8 shows a block circuit diagram of an operation monitor.
Figure 9:
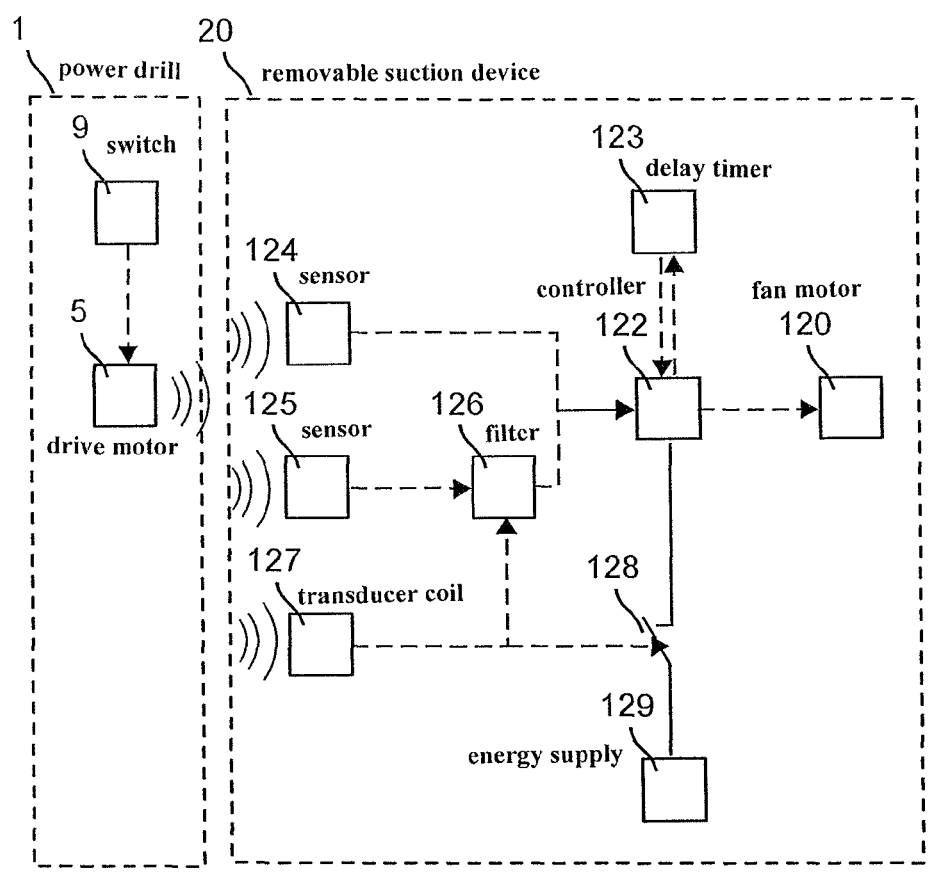
FIG. 9 shows a block circuit diagram of an automatic activation of the suction device.
Figure 10:
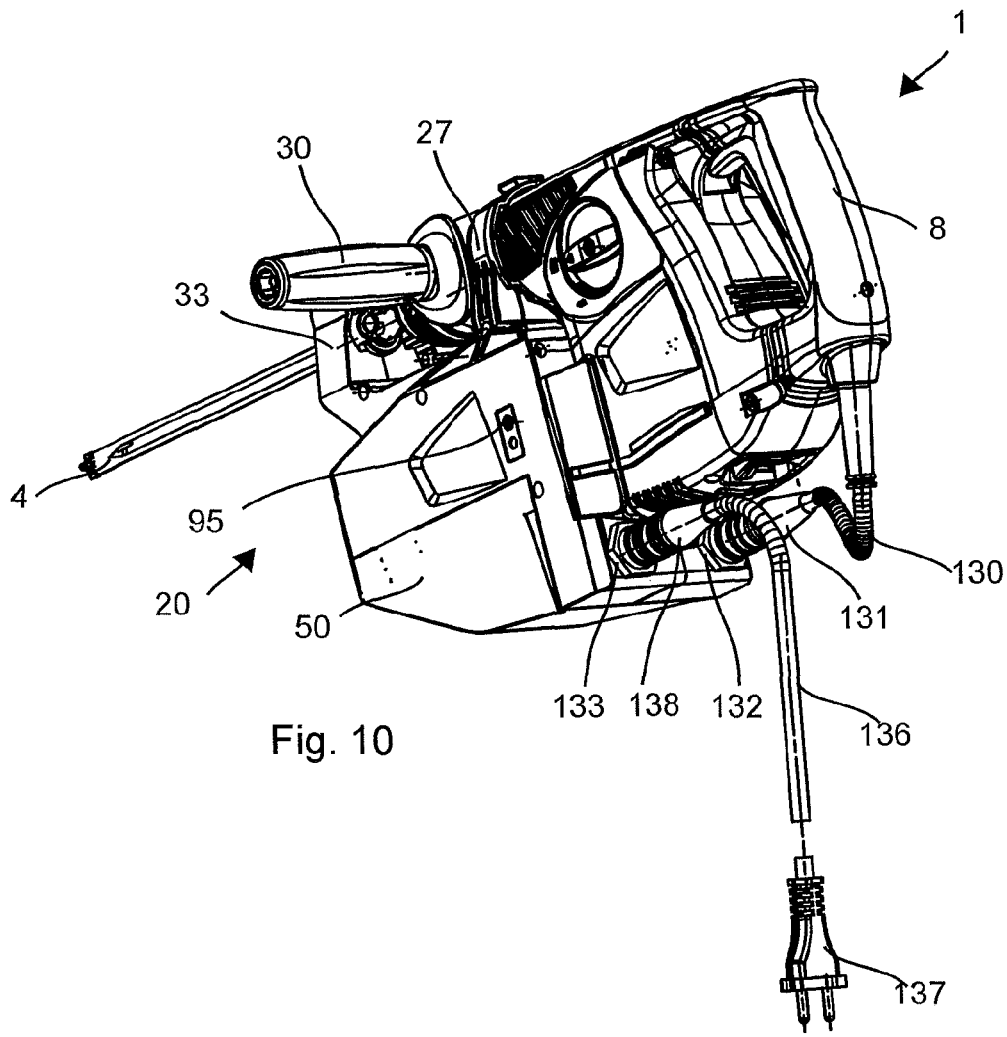
FIG. 10 and FIG. 11 show a pluggable supply lead in a perspective and sectional view.
Figure 11:
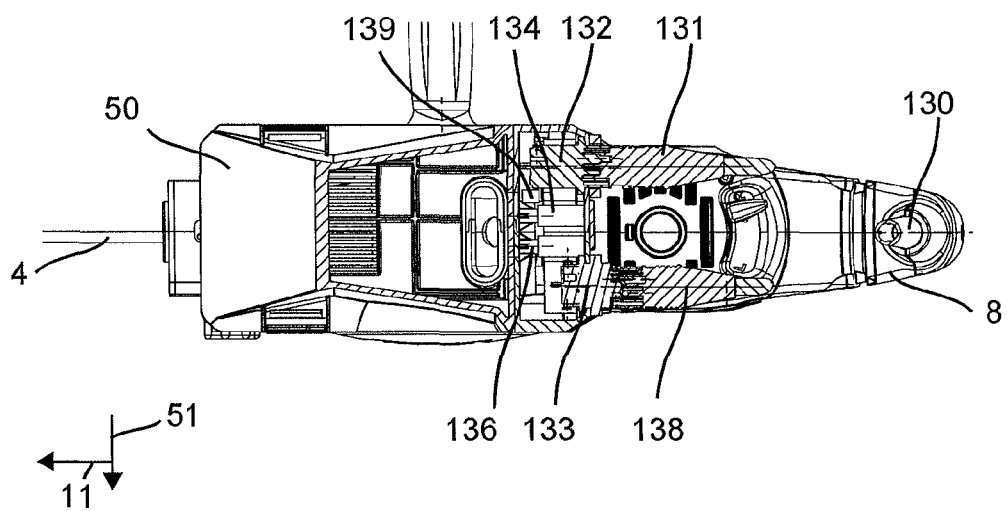
Figure 12:
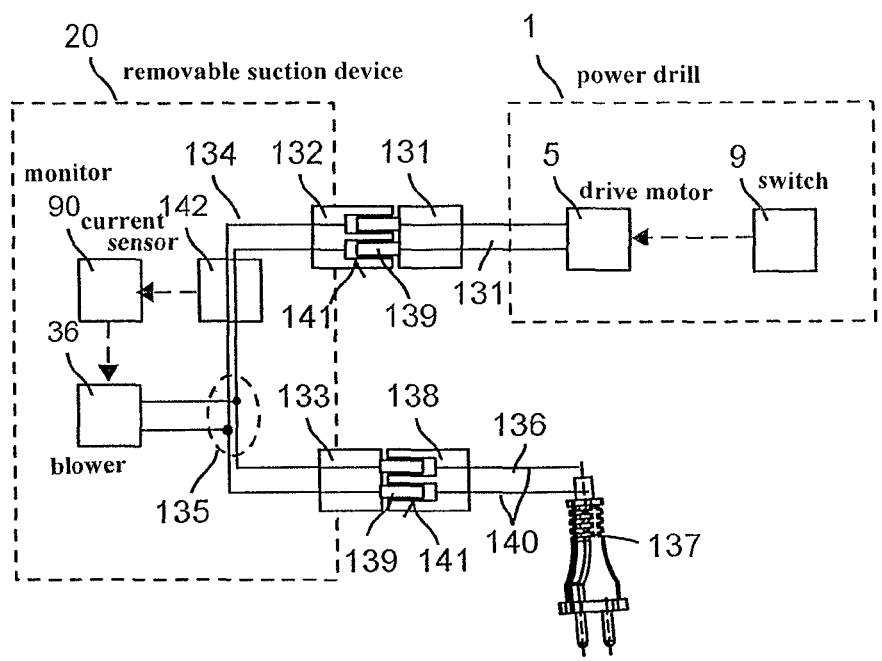
FIG. 12 shows a block circuit diagram of the pluggable supply lead.

In accordance with a different design, a catch 80 is mounted pivotably with pivoting bearings 81 at the side surfaces 67 of the drawer 50 (FIG. 7). The catch 80 has a hook 82, which can take hold of a stud 83 at the housing 21 from behind for locking the drawer 50. The hook 82 is curved at its end, which is the front end in the direction of the pivoting bearing 81. The smaller gap of the front end causes the hook 82 to engage the stud 83. A crossbar 85 can connect the two catches 80. The distance between the pivoting bearing 81 and the hook 82 is dimensioned to be somewhat shorter than the distance of the pivoting bearing 81 from the stud 83, when the drawer 50 contacts the housing 21 without pressure. The relatively short distance brings about a pre-tension of the drawer 50 against the housing 21, when the catch 80 is engaged.

A monitor 90 checks the proper functioning of the suction device 20. A pressure sensor 91 is disposed in the suction connection piece 33. The pressure sensor 91 preferably detects a pressure difference between the interior of the sleeve 39 and the surrounding pressure. For example, the pressure sensor 91 is constructed as a membrane sensor or as a piezoresistive pressure sensor. The pressure sensor 91 is accommodated in a chamber 92, which is disposed offset to the sleeve 39 and to the air duct 35. The chamber 92 preferably has only one opening, which is connected over a duct 93 with the air duct 35 near the sleeve 39, for example, at a distance of less than 2 cm. Any exchange of air between the chamber 93 and the air duct 35 is therefore very slight. In addition, the cross-section of the duct 93 may be clearly smaller than that of the air duct 35. In the case of one design, the pressure sensor 91 is designed to determine the absolute air pressure in the chamber 93. Alternatively, the pressure sensor 91 can determine a pressure relative to the surroundings. For this purpose, the pressure sensor 91 can close off a further opening of the chamber to the surroundings, in order to be acted upon by the reference pressure.

The pressure within the sleeve 39 or the suction connection piece 33 of this embodiment shall be at least 12 mbar less than the surrounding pressure. Other threshold values for the pressure difference may range from 10 mbar to 20 mbar. If the pressure difference falls below the threshold value, the system signals a malfunction to the user, for example, by activating an acoustic signal 94 or a signal lamp 95. The monitor 90 preferably indicates a malfunction only when the lesser pressure difference occurs for a minimum period when the blower 36 is running. For example, the monitor 90 is activated and deactivated together with the blower 36. Preferably, the deactivated monitor 90 does not detect any new malfunction, but may, for example, continue to indicate a malfunction, which has been detected previously. The error signal is deposited for this purpose in a memory 96. Moreover, in the case of a subsequent starting up, the memory 96 can be read and the malfunction can be optionally shown once again. The monitor 90 is reset, for example, by removing the collection container 32, by means of which the error signal is cancelled and the signal light 95 is extinguished. A sensor 97, such as an electric pushbutton, detects the removal of the collection container 32.

The further pressure sensor 98 may be disposed within the air duct 35, for example, at the collection container 32 near the end of the air duct 35. The threshold for this pressure sensor is set at a higher value, for example, a value ranging from 25 mbar to 35 mbar.

A capacitative sensor 100 is disposed at the air duct 35. The sensor may, for example, contain two opposite plate electrodes 101, which are isolated from one another by the air duct 35. An evaluator 102 determines the electrical capacity between the electrodes 101. The evaluator 102 contains, for example, an electrical oscillating circuit, the resonance frequency of which is fixed by the capacity. A frequency scan of the oscillating circuit determines a measure of the capacity. The capacity itself is used in order to determine the dust content of the aspirated air. The evaluator 102 compares the dust content with a threshold value. If the dust content falls below the threshold value, the user is warned that the suction drill 4 is blocked. The evaluator 102 may activate, for example, the acoustic or the optical signaler 94, 95 of the monitor 90. A piezoelectric sensor 103 may be disposed, for example, in a curvature of the air duct 35. The heavier dust particles impinge on the sensor 103. The rate of impacts is a measure of the dust transported, which can be supplied to the evaluator 102. The evaluator 102 may be implemented by a microprocessor or as an analog circuit.

In a further development, the monitor 90 communicates with the hammer drill 1. The hammer drill 1 has an automatic switch off 110, which, responding to an error signal of the monitor 90, deactivates the drive motor 5 or, responding to the evaluator 102, decreases the demolition performance by reducing the rpm of the drive motor 5. Preferably, the communication is wireless, for example, over an inductive transmitter 111, which is disposed at the mutually contacting sections of the housing 17, 21.

The blower 36 has a fan motor 120, preferably, an electric motor and a fan wheel 121. The fan motor 120 drives the fan wheel 121, which aspirates air through the air filter 37 and the air duct 35. A controller 122 of the suction device 20 activates the fan motor 120, when a user starts to operate the hammer drill 1 with the systems switch 9. Furthermore, the controller 122 switches the suction device 20 off when the user no longer operates the hammer drill 1. The switching off may be delayed in that the controller 122 initially activates a timer 123, when the user switches the hammer drill 1 off. At the end of the time specified by the timer 123, the controller 122 switches the suction device 20 off. Preferably, the time span ranges from 2 to 20 seconds. The time span is sufficient so that the dust remaining in the hollow tube of the suction drill is sucked out. Usually, a longer time span does not lead to a better result, since the user meanwhile has removed the suction drill from the borehole and any remaining dust has been removed from the hollow tube.

The controller 122 of the blower 36 is connected to a sensor 124, which detects the static magnetic field generated by the drive motor 5. The drive motor 5 is, for example, is a universal motor, which, without permanent magnets, does not produce a magnetic field when stationary, but does produce one when running, because of the current flowing through the magnetic coils. The sensor 124 is, for example, a reed switch, which responds to the strength of a magnetic field. With a simple configuration, the sensor 124 switches discreetly between two states, one state being assigned to an absent or weak magnetic field of the stationary drive motor 5 and another state to the strong magnetic field of the rotating drive motor 5. A threshold value for the magnetic field is specified by the mechanical construction of the reed switch. A different configuration uses a Hall effect device as a sensor 124, the output signal of which is a measure of the strength of the magnetic field. The controller 122 discriminates the output signal transmitted to it by means of a threshold value. Because of its mechanical locking 26, the suction device 20 typically can be fitted to one or a few models of hammer drills 1 or other hand-held power tools. The reed sensor and the threshold value of the suction device 20 are adapted to the respective model types and the drive motors contained. Model types with a direct current motor contain permanent magnets, which produce a magnetic field even when the drive motor 5 is stationary. The rotating drive motor 5 has a stronger magnetic field. The strengths of the two magnetic fields are characteristic of a model type; the threshold value is a value between the strengths of the two magnetic fields.

A further version uses a sensor 125, which responds to the alternating magnetic field of the drive motor 5. The stationary drive motor 5 does not irradiate an alternating field and, instead, produces only a static magnetic field. The sensor 125 is, for example, a Hall sensor, which determines the strength of the magnetic field or of a signal, which is proportional to the strength of the magnetic field. A high pass filter 126 with, for example, a limiting frequency of 500 Hz, filters out those portions of a signal having a lower frequency. The alternating fields, emanating characteristically because of the rotation of the drive motor 5, are above 2000 Hz for the drive motors used. The filtered signal, belonging to a stationary drive motor 5, should be about zero independently of its construction. The filtered signal is supplied to the controller 122. The controller 122 discriminates the amplitude of the filtered signal using a threshold value. The controller 122 switches the fan motor 120 on, when the filtered signal exceeds the threshold value. The controller 122 switches the fan motor 120 off when the filtered signal falls below the threshold value or decreases to zero. In the case of one design, the controller 122 activates the timer 123 when the threshold value is not reached. The timer 123 delays switching off the fan motor 120.

A further design contains a transducer coil 127. The transducer coil 127 is disposed in the housing 21 in such a manner that, for a suction device 20 mounted close to the hammer drill 1, the transducer coil is close to the drive motor 5. Furthermore, an axis of the transducer coil 127 is parallel to the axis of rotation of the drive motor 5. The alternating field of the drive motor 5 induces a current in the transducer coil 127. The current can be supplied to the high pass filter 126 as a signal. The signal is evaluated much like the signal of the Hall sensor 124 described above. The current, induced in the transducer coil 127, is sufficient for activating the electrical circuit of the controller 122. For example, the current can engage a switch 128, which couples the controller 122 with an energy supply 129, particularly, with a battery compartment. The switch 128 is constructed, for example, as a bistable relay. When the fan motor 120 is deactivated, the relay is reset.

Power is supplied to the hammer drill 1 and the suction device 20, for example, over a common mains connection 129. The hammer drill 1 has a short connecting cable 130, which is permanently attached at one end within the hammer drill 1 and is rewired. A different end of the connecting cable 130 is accessible outside of the hammer drill 1 and provided with a plug 131. The connecting cable 130 is less than 20 cm long. At the suction device 20, there is a socket, which is complementary to the plug 131. The short connecting cable 130 can be connected to electrically by means of the plug 131 with the suction device 20. Furthermore, a plug 133, which is identical with the plug 131 of the hammer drill 1, is provided at the suction device 20. An electrical lead 134 within the suction device 20 connects the socket 132 with the plug 133. A pickup 135 at the electrical lead 134 supplies the blower 36 and the other electrical components with current. A mains cable 136 is provided at one end with a plug 137, which corresponds to the house connection typical of the country of use. At the other end, a socket 138, similar to the socket 132, is attached. A user can optionally connect the mains cable 136 with the short connecting cable 130, if the suction device 20 is not to be used. Otherwise, the user can connect the mains cable 136 with the suction device 20 and the hammer drill 1 by means of the short connecting cable 130, in order to provide both devices with current. The mains cable 136 preferably has a length of at least 1.5 m.

The plugs 131, 133 have protruding pin-shaped electrical contacts 139, which are connected with the current-carrying strands 140. For a one-phase power supply, the plugs have two pin-shaped electrical contacts 139 for the outer conductor and the neutral leader. Furthermore, a contact for the protective conductor may be provided. The sockets 132, 138 have two sleeve-like contacts 141, into which pin-shape contacts 139 of the socket 131, 138 can be pushed. The sleeve-like contacts 141 preferably are not accessible from the outside or are electrically insulated.

The socket 132 and the plug 133 are mounted on the housing 21 so as to be freely accessible. The socket 132 and the plug 133 are provided, for example, in a lower region at the back 23, which is not intended as a contacting surface with the hammer drill 1. The user can detach or connect the electrical connectors independently of whether or not the suction device 20 is connected to the hammer drill 1.

A current sensor 142 can detect the flow of current through the electrical lead 134. For example, the current sensor 142 may contain a voltage sensor, which measures the voltage drop between the plug 133 and the socket 132 of the suction device 20. The current increases when the user starts to operate the hammer drill 1. The controller 90 taps the signals of the current sensor 142 and automatically switches on the blower 36 when the current exceeds a threshold.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hand-held power tool, comprising:
a power tool housing;
a power tool motor disposed within the power tool housing;
a suction device with a suction device housing, wherein the suction device housing is fastened to the power tool housing;
a suction device fan motor disposed within the suction device housing; and
a controller with a sensor, wherein the controller is coupled to the suction device fan motor;
wherein the controller is configured to activate the suction device fan motor when the sensor detects a rotating state of operation of the power tool motor, wherein a magnetic field generated by the power tool motor is detectable by the sensor, and wherein the controller activates the suction device fan motor when a strength of the magnetic field exceeds a threshold.

2. The hand-held power tool according to claim 1, wherein the magnetic field is a static magnetic field.

3. The hand-held power tool according to claim 1, wherein the magnetic field is an alternating magnetic field and wherein a signal of the sensor is supplyable to a high pass filter.

4. A hand-held power tool, comprising:
a power tool housing;
a power tool motor disposed within the power tool housing;
a suction device with a suction device housing, wherein the suction device housing is fastened to the power tool housing;
a suction device fan motor disposed within the suction device housing; and
a controller with a sensor, wherein the controller is coupled to the suction device fan motor;
wherein the controller is configured to activate the suction device fan motor when the sensor detects a rotating state of operation of the power tool motor;
wherein a switch is disposed between an energy supply of the suction device and the controller, wherein the sensor contains a transducer coil coupled to the switch, and wherein the switch is switchable to an on position by a current induced in the transducer coil by the power tool motor.

5. A hand-held power tool, comprising:
a power tool housing;
a power tool motor disposed within the power tool housing;
a suction device with a suction device housing, wherein the suction device housing is fastened to the power tool housing;
a suction device fan motor disposed within the suction device housing; and
a controller with a sensor, wherein the controller is coupled to the suction device fan motor;
wherein the controller is configured to activate the suction device fan motor when the sensor detects a rotating state of operation of the power tool motor;
wherein the controller contains a timer and wherein a deactivating of the suction device fan motor by the controller, when the sensor detects a stationary state of operation of the power tool motor, is delayable by the timer.

* * * * *